Sept. 28, 1948.    G. G. SMITH    2,450,170
FITTING
Filed Nov. 15, 1946
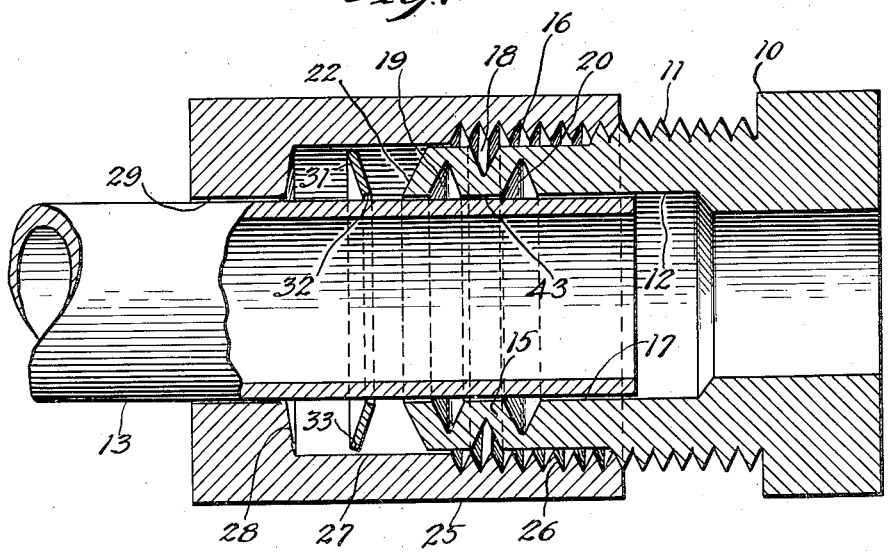
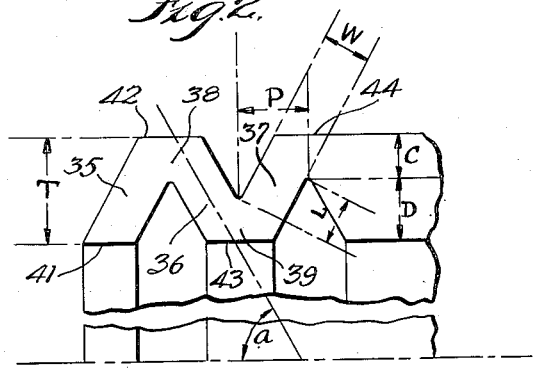
INVENTOR.
George Goodwin Smith.
BY Robert L Kahn
Atty:

Patented Sept. 28, 1948

2,450,170

UNITED STATES PATENT OFFICE 2,450,170

FITTING

George Goodwin Smith, Chicago, Ill., assignor to Robert L. Kahn, Chicago, Ill., as trustee Application November 15, 1946, Serial No. 710,189

4 Claims. (Cl. 285—122)

This invention relates to a fitting for retaining smooth round pipes or rods tightly in sealed relationship. A fitting embodying the present invention has numerous applications in connection with liquid and gas lines, as well as conduits and the like. A fitting embodying the present invention will retain a pipe tightly and will provide seals capable of withstanding pressures up to as much as five thousand pounds per square inch. No special preparation of the pipe to be retained is required. The fitting itself is simple to manufacture and may be used easily and efficiently.

The invention in general provides for an extension, either integral with or separate from a threaded fitting body or externally threaded thimble. The extension and threaded body have coaxial bores into which a pipe is to be inserted. A nut or internally threaded thimble having suitable shoulder means engaging the free end of the extension cooperates with the externally threaded thimble to exert a longitudinal compressive force upon the extension. As will be explained later in connection with a detailed description of the invention, the extension has structural characteristics which provide annular extension portions cooperating with the pipe and the interior of the nut to provide a tight seal.

The invention further contemplates an auxiliary locking means which grips the pipe or rod firmly to prevent pressure from extruding the pipe or rod out of the fitting.

The entire fitting, including the extension, is made of suitable metals having substantial strength and subject to cold flow. Thus, the threaded body of the fitting may be made of steel, brass, bronze or other metal or alloy. The same is true of the nut and extension. The extension itself may, if desired, be of softer material than the nut but cannot be of any packing material as lead. The locking means must be of a material substantially harder than the pipe or rod being gripped. Where steel is not objectionable, the locking means may be of hardened steel.

It is understood that the design of a fitting not only involves pressures to be handled, size and material of pipe, maximum permissible wrench torque on the nut but also involves the nature of the extension material, elastic properties thereof, its compression and bending characteristics and other physical characteristics which will occur to one skilled in the art.

In order that the invention may be understood, a description thereof, both generally and specifically, will be given in connection with the drawings wherein Figure 1 is a view, partly in section, of a fitting embodying the present invention, the fitting being assembled but not tightened to a sealing position. Figure 2 is an enlarged sectional detail of a portion of the extension.

Referring first to Figure 1, the fitting comprises body 10 having externally threaded thimble portion 11 as part of the fitting body. Body 10 may be formed of any suitable stock of any of the metals previously mentioned and may be shaped to form a hexagonal nut-shaped portion. Threaded portion 11 and body 10 have bore 12 for the reception of pipe 13.

Threaded portion 11 has extension 15 integral therewith although the extension may be separate if desired. It will be noted that extension 15 has its bore coaxial with bore 12 of the fitting body. The extension bore and fitting bore may be the same and formed in one operation. It is understood, however, that the extension bore may have a different diameter than the bore of threaded portion 11.

Extension 15 has outer face 16 and inner face 17. Outer face 16 is provided with at least one annular groove or channel 18. Groove 18 is preferably similar to the standard thread groove in a V machine thread with the angle being about sixty degrees. Other angles may be used as hereinafter more fully set forth. The root of groove 18 may have a circular or other shape in a manner resembling standard machine threads. This, however, is not important.

Extension 15 is also provided with internal grooves or channels 19 and 20 longitudinally displaced along the axis from outer groove 18. Preferably, though not necessarily, grooves 19 and 20 are symmetrically disposed with reference to outer groove 18. It is understood that the three grooves are circular and extend completely around the extension. Extension 15 has end face 22 preferably, though not necessarily, near groove 19 and shaped to provide a generally conical surface here shown as convex though concave may be used. While three grooves are shown, it is possible to reduce this number. More than three is generally undesirable.

It is possible to have two outer grooves and one inner groove. It is also possible to have an outer groove adjacent the extension end.

The extension grooves may be formed by rolling the metal or cutting with a suitably shaped cutting tip, this being well known in the art. For convenience in manufacture, outer face 16 of extension 15 may have a diameter equal to the minor diameter of threaded portion 11. Extension 15 may, however, have an outer diameter smaller than this if desired.

The fitting includes nut or thimble 25 having internal threaded portion 26 for engagement with threaded portion 11 of the fitting. Nut 25 has bore 27 whose diameter is slightly larger than the diameter of outer face 16 of extension 15 for clearance. Bore 27 may be originally formed in the entire thimble body after which threaded portion 26 may be formed. Threaded portions 11 and 26 may be of any type, either V or square. The pitch of the thread may be standard for the diameter required or may be designed to generate the required compression in extension 15.

Thimble 25 has shoulder 28 at the end of bore 27. Nut 25 has its rear end provided with bore 29 for clearing pipe 13. Shoulder 28 may have any desired shape and, in normal manufacturing operations, would have a generally conical concave surface as shown. The degree of concavity or, from a sectional view, the tilt of shoulder 28 with respect to the thimble axis would depend upon the lip angle if a drill is used for boring or the corresponding angle at the tip of a cutting tool. It is preferred to have shoulder 28 and end face 22 so shaped relative to each other that a generally V-shaped groove is provided between the two providing no lock washer as hereinafter described is used. Thus, when the thimble is drawn up so that shoulder 28 contacts extension 15, an external V groove will be formed between the two This, however, is not essential and may be varied.

In order to lock pipe 13 in the fitting against the tendency of high pressure to pull the pipe out, the following additional means may be provided. Dished or conical lock washer 31 is disposed between extension face 22 and shoulder 28 of the thimble. Washer 31 is continuous and not split, and is preferably disposed so that the taper is away from extension 15. Washer 31 may be of hardened steel and harder than pipe 13. Thus, if pipe 13 is of copper or brass, washer 31 may be of soft steel. Washer 31 has inner edge 32 normally clear of the outer surface of pipe 13. The clearance, however, is small enough so that, when washer 31 is flattened by pressure, inner edge 32 will bite into the outer surface of pipe 13. To this end, inner edge 32 may be quite sharp. Outer edge 33 of washer 31 is provided with sufficient clearance with respect to bore 27 so that thimble 25 may be turned to take up the clearance from extension 15. The angularity or dish of washer 31 with respect to the axis of the thimble may be varied within wide limits and need not necessarily be the same as the tilt of end face 22 of extension 15. The thickness of washer 31 will depend upon various factors, and the design of such a washer is well within the skill of the average mechanic.

It is understood that washer 31 may be omitted and reliance had upon the gripping action of extension 15 upon pipe 13. In fact, the washer may generally be omitted except where high pressures are involved.

No attempt has been made to show the amount of clearances and the relative sizes of the clearances. In general, the clearance between outside extension face 16 and bore 27 of the thimble should be small enough so that the two have a small initial separation therebetween which may be taken up when the fitting is tightened. The separation may be large enough, of the order of a few thousandths of an inch for example, to be well within tolerances of quantity production manufacturing methods. The same applies to the diameter of bore 12 or inside face 17 of extension 15 whichever is smaller.

Referring now to Figure 2, an enlarged view of part of extension 15 is shown in connection with which certain structural details and characteristics of the extension will be set forth. Thus, as finally formed with internal and external grooves, a series of annular wall portions 35, 36 and 37 will be formed. Wall portions 35 and 36 are joined by sealing portion 38, while wall portions 36 and 37 are joined by sealing portion 39. For convenience in discussing the extension portion, the thickness of the extension will be indicated by letter T, while the depth of the grooves or channels will be indicated by letter D. It is not necessary that D be the same for all grooves. The distance along the length of the extension between the roots of adjacent inner and outer grooves, hereinafter referred to as groove displacement or stagger, will be indicated by letter P, while the distance between the root of a channel and the opposite extension face will be indicated by letter C. The length of a wall is L, while the thickness is W. It will be assumed, for simplicity, that the internal and external grooves are symmetrical and similar, both in angle and dimension. Within some limits, however, this need not necessarily be the case.

Depth D of a groove, either internal or external, must be greater than one-half sleeve thickness T. The preferred ratio is between about sixty and about eighty percent of the total extension thickness T. Naturally, C will be less than one-half of T. C must be small enough so nut 25 can provide necessary compressive force. For steel or iron pipe, T, in general, should not be less than about .045 inch. A range of between about .045 and about .090 is ample for all practical purposes. For brass pipe, T may be larger and can go to about one-eighth inch. Larger values of T are generally unnecessary and undesirable.

The groove angle must be such that angle $a$ made by the groove wall and extension axis will be greater than fifty degrees and less than ninety degrees. The groove wall must slope toward the center of the groove root. A generally V-shaped groove has proven highly effective. The groove angle should not be greater than about seventy degrees and must be substantially less than ninety degrees. The preferred range of groove angle is between about forty-five degrees and about sixty-five degrees. Thus, with a symmetrical sixty-degree groove, angle $a$ will be sixty degrees.

Distance P between adjacent inner and outer grooves must be great enough so that distance C is less than W, the wall thickness. W must, therefore, be no less than one-half of extension thickness T. On the other hand, P should not be too great. Thus, P need not be much larger than extension thickness T. For best results, P may be between about T and D, although anywhere between one-half T and 2T may be used. Preferably the groove nearest the extension edge will be displaced no more than two times the extension thickness. In general, groove displacements about equal to extension thickness will give good results. It follows that length L of a wall will never be large in comparison to wall thickness W. Thus, apart from the circumferential reinforcement, an extension will always bend at the groove roots and will not buckle along the wall length. The size of angle $a$ will insure that a large part of the compression force due to nut 25 will be directed toward tilting the sloping walls to a more vertical position with reference to the opposed surfaces of the pipe and nut.

By virtue of the extension construction, faces 41, 42, 43 and 44 are formed, which faces initially are annular and cylindrical. In particular, faces 42 and 43 have substantial dimension along the length of the extension. Thus, a broad (along the extension axis) base for each wall is provided. The small number of grooves and resulting walls permits complete sealing to occur with rigid support at the ends of the extension.

It has been observed that substantial deformation of surface 42 and to some extent surface 43 results during a tightening operation. Face 44 opposite groove 20 is affected to a less degree. Groove 20 may be omitted if desired.

The nature of faces 41, 42 and 43 are such, particularly when they are flat, as to permit of longitudinal movement with respect to the pipe surface and nut bore respectively. While friction is considerable at these surfaces after the nut has engaged the extension, it is evident that the small amount of sliding between these faces and pipes and nut permit the entire fitting to assume a desirable sealing condition without buckling of walls 35, 36 and 37.

It will be apparent from the above considerations that thickness T of the extension may vary within substantial limits depending upon the nature of the extension material and compressive force generated by nut 25 against the extension. Thus, as an example, in the case of a steel fitting for use with electrical conduit, extension 15 and threaded portion 11 had an internal diameter of .715 inch. The diameter of the external extension surface was .805 inch. The body portion 10 was of one-inch hex stock, while threaded portion 11 had a major diameter of .875 inch with twenty-seven threads to the inch. The channels in extension 15 were sixty degrees with a depth of .030 inch. Distance P was .045 inch equal to extension thickness T, while the distance between the root of channel 19 and the forward inner edge of face 22 was .060 inch. The nut had an angle of about five degrees for shoulder 28 with the length of bore 27 being about one-sixth of an inch. The length of threaded part 26 was about one-half inch. The over-all length of the nut was of the order of about three-quarters of an inch.

In the case of smaller fittings for use on liquid lines, such as in connection with hydraulic brakes for automobiles and similar articles, the diameter of the fittings would normally be smaller. With such fittings, thickness T of the extension may be larger due to the fact that brass is not as strong as steel and also due to the fact that high pressures are to be used inside of the pipe as compared to steel conduit. It is evident that, as long as C is small enough to permit bending by pressure developed from nut 25, thickness T of the extension may vary over as great a range as desired to suit conditions.

What is claimed is:

1. A metal fitting for retaining the smooth end of a pipe comprising a pair of coupling thimbles having cooperating inner and outer threaded portions, the thimble having the outer threaded portion having an integral annular extension with staggered inner and outer generally V-shaped annular grooves, each groove having a depth of between about .6 and about .8 times the extension thickness with a groove angle between about 45 and about 65 degrees and a stagger between adjacent inner and outer grooves between about ½ and about 2 times the extension thickness, said thimble having the inner threaded portion having an inner shoulder for exerting force upon the free end of the extension, said thimbles being adapted to be drawn up tightly to provide flow of metal without buckling the conical shaped walls formed by the groove.

2. The fitting of claim 1 wherein the annular extension has one outer and two inner grooves.

3. The fitting of claim 1 wherein the annular extension has one outer and two inner grooves with the end of the extension being no more than two times the extension thickness from the nearest inner groove.

4. The fitting of claim 1 wherein the annular extension has one outer and two inner grooves with the end of the extension shaped to provide a convex conical surface spaced from the nearest inner groove less than two times the extension thickness and the shoulder of the thimble having the inner threaded portion forming initially an outer groove with said conical extension end.

GEORGE GOODWIN SMITH.

REFERENCES CITED

The following references are of record in the file of this patent:

UNITED STATES PATENTS

| Number | Name | Date |
| --- | --- | --- |
| 1,799,834 | Waterman | Apr. 7, 1931 |
| 1,840,312 | Dunmire | Jan. 12, 1932 |